US008793781B2

(12) United States Patent
Grossi et al.

(10) Patent No.: US 8,793,781 B2
(45) Date of Patent: Jul. 29, 2014

(54) METHOD AND SYSTEM FOR ANALYZING POLICIES FOR COMPLIANCE WITH A SPECIFIED POLICY USING A POLICY TEMPLATE

(75) Inventors: Aldo P. Grossi, Wallingford, PA (US); Claire-Marie N. Karat, Greenwich, CT (US); Peter K. Malkin, Ardsley, NY (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/871,374

(22) Filed: Oct. 12, 2007

(65) Prior Publication Data
US 2009/0100498 A1 Apr. 16, 2009

(51) Int. Cl.
G06F 21/00 (2013.01)

(52) U.S. Cl.
USPC .................. 726/10; 719/318; 379/220.01

(58) Field of Classification Search
USPC .......................... 719/318; 726/1, 27
See application file for complete search history.

(56) References Cited

U.S. PATENT DOCUMENTS

| 7,171,459 | B2 * | 1/2007 | Sanghvi et al. | 709/223 |
|---|---|---|---|---|
| 7,228,561 | B2 * | 6/2007 | Sameshima et al. | 726/2 |
| 7,496,191 | B1 * | 2/2009 | Crews et al. | 379/220.01 |
| 2002/0059471 | A1 * | 5/2002 | Sanghvi et al. | 709/318 |
| 2004/0193703 | A1 * | 9/2004 | Loewy et al. | 709/220 |
| 2004/0193912 | A1 * | 9/2004 | Li et al. | 713/200 |
| 2005/0086252 | A1 * | 4/2005 | Jones et al. | 707/102 |
| 2006/0005228 | A1 * | 1/2006 | Matsuda | 726/1 |
| 2007/0179987 | A1 * | 8/2007 | Lim | 707/200 |
| 2008/0104708 | A1 * | 5/2008 | Kerschbaum et al. | 726/27 |
| 2008/0141338 | A1 * | 6/2008 | Kim et al. | 726/1 |
| 2008/0320550 | A1 * | 12/2008 | Strassner et al. | 726/1 |
| 2009/0007219 | A1 * | 1/2009 | Abzarian et al. | 726/1 |

OTHER PUBLICATIONS

IEEE-SA Standards Board, "Draft Standard Policy Language Requirements and System Architectures for Dynamic Spectrum Access Systems", 2011, IEEE, pp. 1-60.*
Massey, "Assessing the Accuracy of Legal Implementation Readiness Decisions", 2011, IEEE, p. 207-216.*
Karat, et al., "Evaluating Interfaces for Privacy Policy Rule Authoring", Proceedings of the SIGCHI Conference on Human Factors in Computing Systems, CHI '06, Apr. 22-27, 2006; and.
Brodie, et al, An Empirical Study of Natural Language Parsing of Privacy Policy Rules Using the SPARCLE Policy Workbench The SPARCLE Policy Workbench (2006).

* cited by examiner

*Primary Examiner* — Mahfuzur Rahman
*Assistant Examiner* — Gregory Lane
(74) *Attorney, Agent, or Firm* — Scully Scott Murphy & Presser PC; Anne V. Dougherty, Esq.

(57) ABSTRACT

A method and system are disclosed for analyzing policies for compliance with a specified policy. The method comprises the steps of creating a policy template representing said specified policy, and comparing a group of given policies to said policy template to determine whether said given policies conflict with said specified policy. In the preferred embodiment of the invention, the specified policy may include specified rules, the given policies include a plurality of given rules, and the policy template expresses said specified rules. In this preferred embodiment, the comparing step includes the step of comparing said plurality of given rules to the policy template to determine whether any of said given rules conflicts with said specified rules. In addition, preferably, if conflicts are found between said given policies and said specified policy, the given policies are modified to eliminate the conflicts.

18 Claims, 7 Drawing Sheets

POLICY ANALYSIS SERVER COMPONENT DIAGRAM

POLICY ANALYSIS SERVER COMPONENT DIAGRAM

FIG. 5 ANALYSIS GUI APPLIED TO SINGLE POLICY

ANALYSIS GUI APPLIED TO TWO POLICIES

METHOD AND SYSTEM FOR ANALYZING POLICIES FOR COMPLIANCE WITH A SPECIFIED POLICY USING A POLICY TEMPLATE

BACKGROUND OF THE INVENTION

1. Field of the Invention

The invention generally relates to methods and systems for analyzing policies, and more specifically, to analyzing policies for compliance with a specified policy using a policy template. The preferred embodiment of the present invention also relates to services that provide policy compliance verification.

2. Background Art

Due to existing and new legislation, regulations, social factors, changes in technology, and ever-changing demands in the global community, organizations need or may be required on an ongoing basis to add new policies to control access to their information (e.g., security and privacy) as well as control other resources (e.g., network access control using firewalls). Also, once organizations have defined policies, they need to implement these policies in their organizations and to monitor the application of policies in practice.

The SPARCLE Policy Workbench (see Karat, Karat, Brodie, and Feng 2006 (Karat, C., Karat, J., Brodie, C., and Feng, J. (2006). Evaluating Interfaces for Privacy Policy Rule Authoring. *Proceedings of the Conference on Human Factors in Computing Systems*. NY: ACM Press, 83-92) provides a method for users to author and to analyze policies, which can then be enforced, and then, after the system has run, to audit how the newly implemented restrictions were followed. In this disclosure, no method is given to allow a service organization to provide SPARCLE features for a customer. Nor is there any description of how a policy template for a given piece of legislation can be provided or implemented for a customer.

Access control enforcement engines, like IBM's RACF, provide for the specification and enforcement of access control of system resources, but do not allow for the specification of a policy representing legislation. Nor do such systems enable a service organization to check whether a given organization's current access control engine's decisions comply with such new legislation.

SUMMARY OF THE INVENTION

An object of this invention is to provide a method and system for analyzing policies for conflicts or redundancies using a policy template.

Another object of the present invention is to enable an organization to verify that one or more of its policies comply with one or more policy templates, such as legislative policy templates.

A further object of the invention is to enable an organization to verify that access control decisions, from the organization's access control enforcement engine, comply with one or more policy templates.

These and other objectives are attained with a method and system for analyzing policies for compliance with a specified policy. The method comprises the steps of creating a policy template representing said specified policy, and comparing a group of given policies to said policy template to determine whether said given policies conflict with said specified policy. In the preferred embodiment of the invention, the specified policy includes one or more specified rules, and the given policies include a plurality of given rules, the policy template expresses said one or more specified rules. In this preferred embodiment, the comparing step includes the step of comparing said plurality of given rules to the policy template to determine whether any of said given rules conflicts with said one or more specified rules.

In addition, preferably, the method comprises the further step of, if any conflicts are found between said given policies and said specified policy, modifying one or more of said given policies to eliminate said any conflicts. Also, the method may include the further steps of identifying any redundancies in said given policies; and if any redundancies are found in said given policies, modifying one or more of said given policies to eliminate said any redundancies.

For example, said given policies may be privacy policies used to determine user access to given resource. As a more specific example, the specific policy may be legislation enacted by a government body, and the comparing step includes the step of comparing said privacy policies to said policy template to determine whether said privacy policies are in compliance with said legislation. In this example, that legislation may include a set of rules, and the step of creating a policy template may include the step of creating a policy template expressing said set of rules, whereby if there are no conflicts between the privacy policies and said policy template, then the privacy policies are in compliance with said legislation.

The preferred embodiment of the invention, descried below in detail, enables:

1. Checking that a given policy does not contain any conflicts or redundancies with one or more given other give policies, e.g., legislative policy templates;
2. Checking that one or more given policies do not contain any conflicts or redundancies with a given policy, e.g., a legislative policy template; and
3. Summarizing all of the agreements and disagreements between a given system access control decision log and a given one or more policies (including legislative policy templates).

In this embodiment of the invention, the policies adhere to the Privacy profile of the OASIS XACML standard (for details, see http://xml.coverpages.org/xacml.html). In this standard, each policy is comprised of zero or more rules, and there is either a default-accept or default-deny policy in effect; there cannot be a mixture of rules with different defaults in a given policy. In the preferred embodiment of this invention, a default-deny is in effect, meaning that any given request will be denied unless one or more rules from a given policy accept it.

It may be noted that there are a variety of terms for referring to policies and policy components. One set of terminology defines a policy as containing one or more rules. Each of the rules includes information that defines how users or systems may access or interact with organizational assets and resources including people and data in its many forms. Others working in the field of policy use different terminology to represent the same ideas. Alternative terminology is to say that a policy set contains one or more policies. These two sets of terminology for referring to policies (policies and rules within them, or a policy set and policies within the set) can be used interchangeably.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
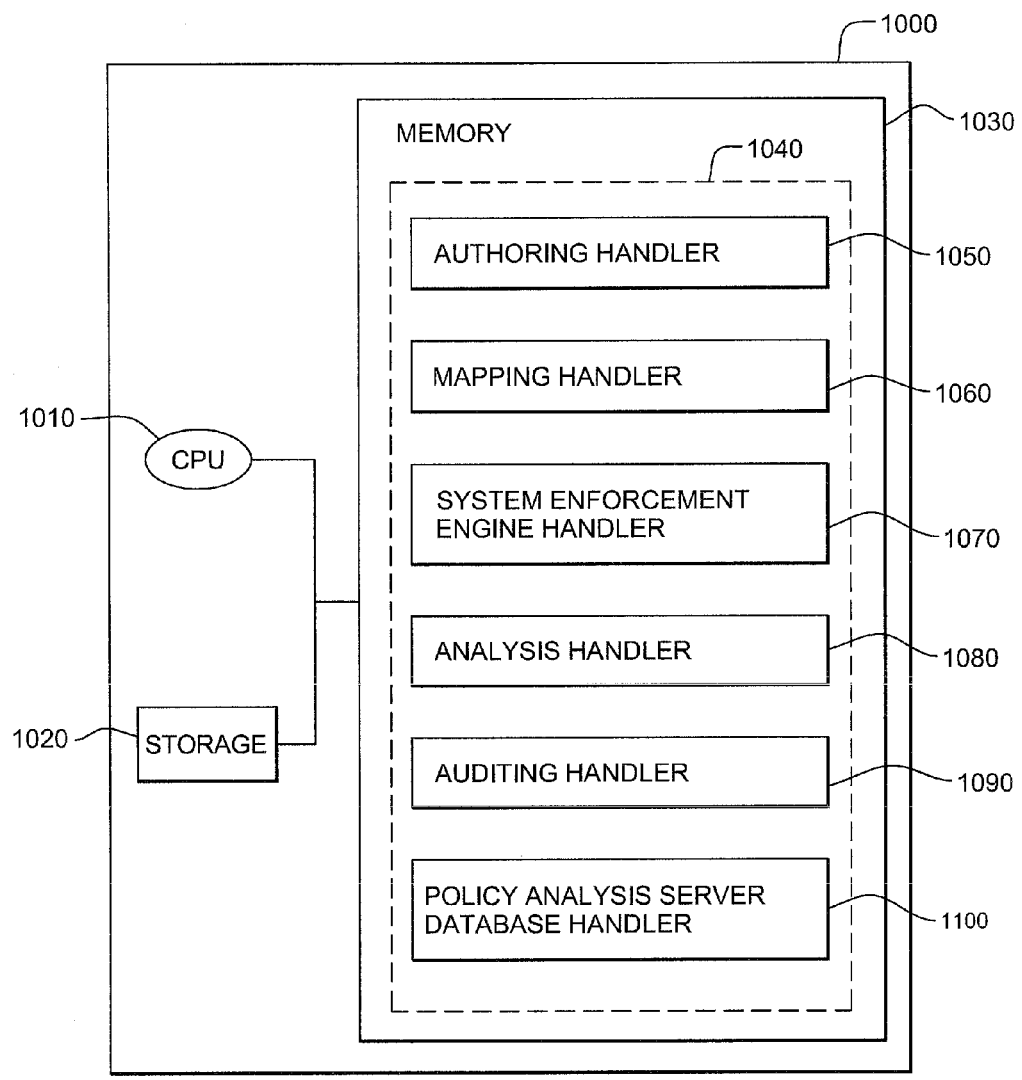
FIG. 1 is an illustrative component block diagram showing an example of a policy analysis server in one embodiment of the present invention.

The present invention, generally, provides a method and system for analyzing policies for compliance with a specified policy. The method comprises the steps of creating a policy template representing said specified policy, and comparing a group of given policies to said policy template to determine whether said given policies conflict with said specified policy. In the preferred embodiment of the invention, the specified policy includes one or more specified rules, and the given policies include a plurality of given rules, the policy template expresses said one or more specified rules. In this preferred embodiment, the comparing step includes the step of comparing said plurality of given rules to the policy template to determine whether any of said given rules conflicts with said one or more specified rules.

In addition, preferably, the method comprises the further step of, if any conflicts are found between said given policies and said specified policy, modifying one or more of said given policies to eliminate said any conflicts. Also, the method may include the further steps of identifying any redundancies in said given policies; and if any redundancies are found in said given policies, modifying one or more of said given policies to eliminate said any redundancies.

For example, said given policies may be privacy policies used to determine user access to given resource. As a more specific example, the specific policy may be legislation enacted by a government body, and the comparing step includes the step of comparing said privacy policies to said policy template to determine whether said privacy policies are in compliance with said legislation. In this example, that legislation may include a set of rules, and the step of creating a policy template may include the step of creating a policy template expressing said set of rules, whereby if there are no conflicts between the privacy policies and said policy template, then the privacy policies are in compliance with said legislation.

The preferred embodiment of the invention enables:
1. Checking that a given policy does not contain any conflicts or redundancies with one or more given other give policies, e.g., legislative policy templates;
2. Checking that one or more given policies do not contain any conflicts or redundancies with a given policy, e.g., a legislative policy template; and
3. Summarizing all of the agreements and disagreements between a given system access control decision log and a given one or more policies (including legislative policy templates).

In this preferred embodiment of the invention, the policies adhere to the Privacy profile of the OASIS XACML standard (for details, see http://xml.coverpages.org/xacml.html). In this standard, each policy is comprised of zero or more rules, and there is either a default-accept or default-deny policy in effect; there cannot be a mixture of rules with different defaults in a given policy. In the preferred embodiment of this invention, a default-deny is in effect, meaning that any given request will be denied unless one or more rules from a given policy accept it.

The associated grammar specifies that a given policy is comprised of zero or more rules, each rule of the following form:

(User category) (Permission) (Action) (Data category) (Purpose) (Condition optional)

where:
(User category) indicates applicable role or user for the given rule;
(Permission) indicates whether the result of the rule is the permitting or the denial of access;
(Action) specifies the function or application that is either permitted or denied by the given rule;
(Data category) indicates the type of data object that is governed by the rule;
(Purpose) indicates the reason the given role is attempting to perform the given action to the given data category; and
an optional (Condition), which specifies Boolean (true or false) function that is evaluated whenever the given rule is checked, the given rule only being acted upon if the given condition is true.

Examples of rules include:
"Doctors can read blood test results for the purpose of medical treatment"
User category=Doctors
Permission=can
Action=read
Data category=blood test results
Purpose=medical treatment "Nurses can read patient addresses for the purpose of billing if it is a weekday."
User category=Nurses
Permission=can
Action=read
Data category=patients' addresses
Purpose=billing
Condition=it is a weekday A given policy also specifies its default response, i.e. the response returned if none of the rules match a given request. In one embodiment of the current invention, a default deny policy is assumed. This means both that (1) a given request is denied if no policy rule matches the given request's parameters, and (2) all rules specify conditions allowing (permitting) access.

One of ordinary skill in the art will appreciate that although the policy rules of the preferred embodiment conform to the OASIS XACML standard, other privacy policy grammars are also within the scope of the current invention, such as CIM-SPL One of ordinary skill in the art will also appreciate that although the preferred embodiment of the invention involves privacy policies and the control of user's access to data resources, the current invention is also applicable to other access control contexts, such as network communication (e.g., firewalls), private key lifecycles, and physical access control. For instance, the invention may be used with policies related to business processes, where an organization has business process policies and compares them to a regulation-based template or to best practices documented by an industry, for example. This invention can be used to analyze a wide range of business policies.

The present invention also uses the feature of a legislative policy template, which is similar to a standard policy. What distinguishes a legislative policy template is that it policy template, which embodies the requirements of HIPAA law. The power of such templates is that if the decisions of a given organization's access control engines comply with the given HIPAA policy template, then the organization is complying with the law. Even though one group may author a given legislative policy template, the end user of the template can assume full legal liability for its use. Thus, a service organization can author legislative policy templates, but then have the customers assume the legal liability for their use.

FIG. 1 depicts a component diagram of the policy analysis server 1000 in one embodiment of the present invention. This server 1000 may comprise any computing node that is able to load and execute programmatic code, including, but not limited to, products sold by IBM such as ThinkPad® or PowerPC®, running the operating system and server application suite sold by Microsoft, e.g., Windows® XP, or a Linux operating system. As shown in FIG. 1, the policy analysis server 1000 preferably includes a processor device, CPU 1010, a storage device 1020 such as a magnetic or optical disk storage or a direct access storage device (DASD), and a memory 1030, such as RAM. According to the present invention, the server logic 1040 is preferably embodied as computer executable code that is loaded from a remote source (e.g., over a network), local permanent optical (CD-ROM), magnetic storage (such as disk), or DASD 1020 into memory 1030 for execution by CPU 1010.

As will be discussed in greater detail below, the memory 1030 preferably includes computer readable instructions, data structures, program modules and application interfaces forming the following components: Authoring handler 1050; Mapping handler 1060; System enforcement engine handler 1070; Analysis handler 1080, described in detail with reference to FIGS. 3, 5 and 6; Auditing handler 1090, described in detail with reference to FIG. 4; and Policy analysis server database handler 1100.

The authoring handler 1050 enables the creation, parsing modification and deletion of policies, including their rules and terms. Such a handler has been described in both [reference to SPARCLE report Karat, Karat, Brodie, and Feng, 2006] and is available in the IBM Secure Perspective product's authoring utility. Two methods of authoring are provided. One allows a given user to specify the rules of a new policy using a constrained natural language, one template being that given above:

(User category) can (Action) (Data category) for the purpose of (Purpose) (if <Condition> optional)

The other method allows the user just to specify the terms for each new policy from lists of terms that are provided. For further details see Karat, C., Karat, J., Brodie, C., and Feng, J. (2006), OR http://www-03.ibm.com/systems/i/security/.

All of the obtained polices, their rules and terms are stored using the policy analysis server database handler 1100. Presently, this data is stored with associations between a given policy and its rules, as well as each of the rules and all of its terms, thus enabling retrieval and manipulation.

One of ordinary skill in the art will appreciate that the authoring handler 1050 could be augmented with an encoding parser that would allow a given user to specify a policy or rule that they wish to add, this policy or rule being encoded, e.g., using the OASIS XACML policy encoding standard. Given this encoded policy or rule, the encoding parser would decode the policy or rule and then store it using the policy analysis server database handler 1100.

The mapping handler 1060 enables the association of a given system's objects (e.g., users, groups, and resources. Such a handler is available, for example, in the mapping utility provided with IBM Secure Perspective product. The current version of the product provides for mapping between ACL policy terms and the system objects from the IBM iSeries system (see http://www-03.ibm.com/systems/i/security/ or http://www-03.ibm.com/systems/i/security/rethink_security_policy.html or http://www-03.ibm.com/systems/i/security/secureperspective/index.html or http://www-03.ibm.com/systems/pdf/LaunchSecurePerspective_Final_3.pdf for details). Future planned releases of the IBM Secure Perspective product may support other types of platforms, including LINUX, UNIX and Windows. One of ordinary skill in the art will understand that given associations between the policy terms and the system object, the mapping handler 1060 is able to map both terms to objects (e.g., given a policy term, to return the one or more associated system objects) and system objects to terms (e.g., given a system object to return the one or more associated policy terms).

The system enforcement engine handler 1070 provides for the actual control of access to system resources in response to requests: for any given system resource request, the system enforcement engine handler 1070 can return a response indicating whether or not the given request should be granted. The handler also provides a log, which maintains a list of all such requests along with response of the handler to these requests. Many such handlers are available, including these used by the IBM iSeries computer, and any suitable system enforcement engine handler may be used in the practice of the present invention.

The policy analysis server database handler 1100, in one embodiment, provides for creation, deletion and modification of persistent data, and is used by the handlers 1050-1090 of the policy analysis server 1000. An example of a product providing such function includes the DB/2 database system produced by IBM.

Figure 2:
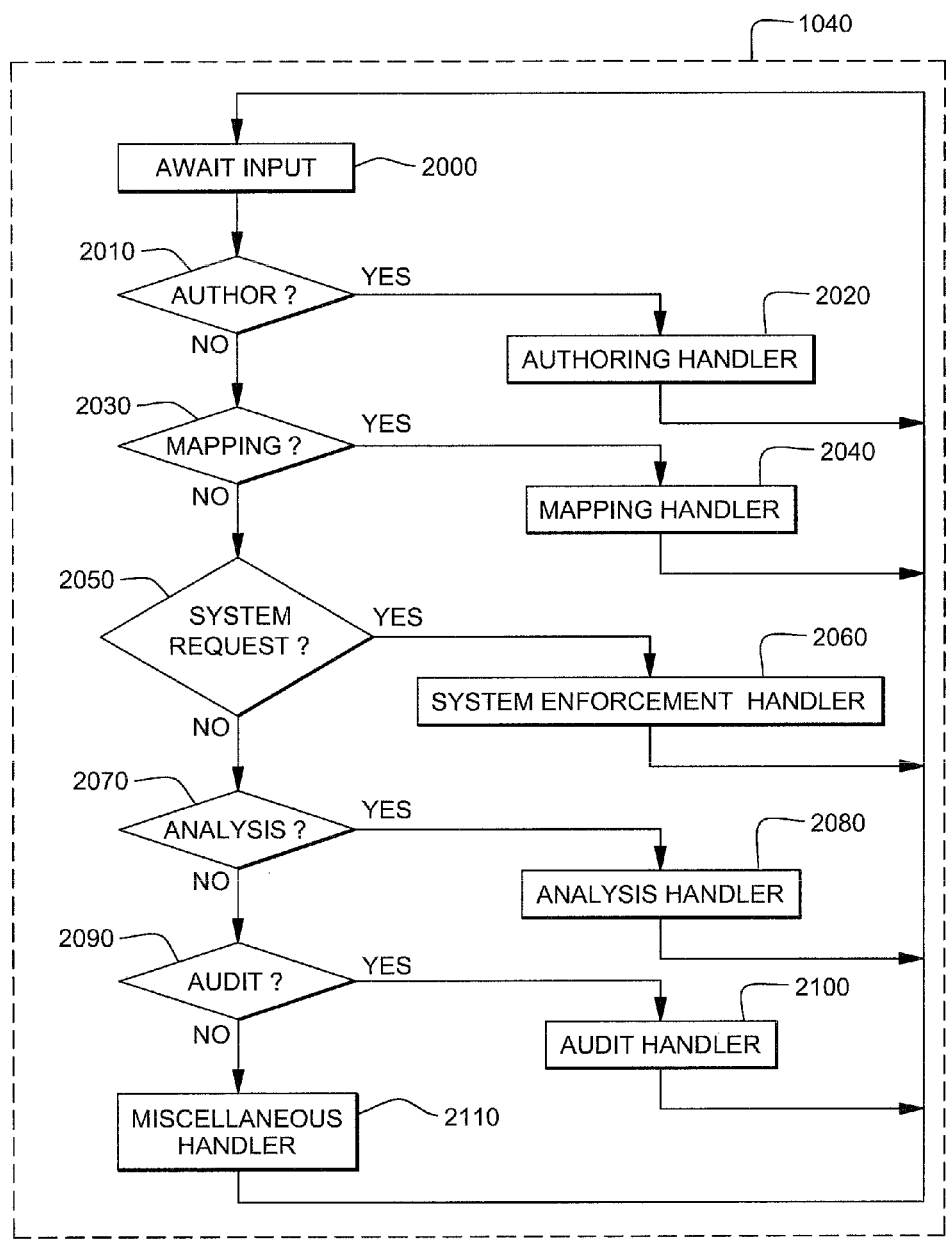
FIG. 2 is a flow diagram illustrating a flow control of a policy analysis server in one embodiment of the present invention.

FIG. 2 is a flow diagram illustrating the control flow of the policy analysis server's logic 1040 in one embodiment of the present invention. At step 2000, the policy analysis server 1000 waits for input. When an input is received, step 2010 determines whether the input is a request for authoring handler 1050, invoking this handler 1050 in step 2020, following which control continues at step 2000. If not, step 2030 determines whether the input is a request for mapping handler 1060, invoking this handler 1060 in step 2040, following which control continues at step 2000. If not, step 2050 determines whether the input is a system request, i.e., a request from a user for data, invoking the system enforcement engine handler 1070 in step 2060, following which control continues at step 2000.

If not, step 2070 determines whether the input is a request for analysis handler 1080, invoking this handler 1080 in step 2080, following which control continues at step 2000. If not, step 2090 determines whether the input is a request for auditing handler 1090, invoking this handler 1090 in step 2100, following which control continues at step 2000. Otherwise, a miscellaneous handler is invoked in step 2110 to process the input, following which control continues at step 2000. The miscellaneous handler may process the input in any suitable way, as determined or selected by the user, and any suitable handler may be used at step 2110.

Figure 3:
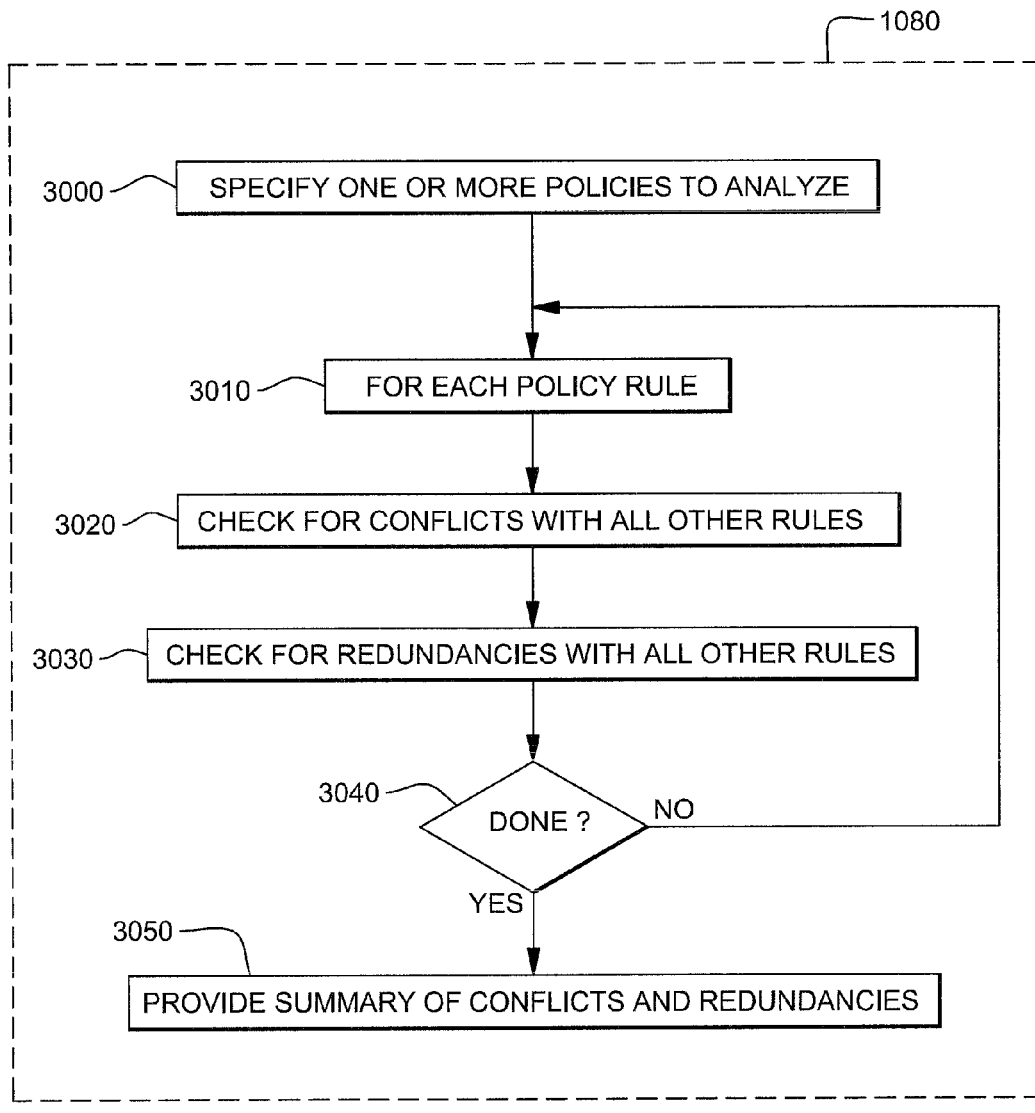
FIG. 3 is a flow diagram of the analysis handler of FIG. 1 in one embodiment of the present invention.

FIG. 3 depicts the control flow of the analysis handler 1080, this handler identifying conflict and redundancies, both within a given policy and across two or more policies. This handler 1080 assumes that all relevant rules are already stored in the policy analysis server 1000 using the policy analysis server database handler 1100. If all the relevant rules are not so stored, then any missing policy has to be added using the authoring handler 1050. One of ordinary skill in the art will appreciate that even though a given policy is stored in the policy analysis server 1000 using the policy analysis server database handler 1100 with its terms mapped to the given system objects using the mapping handler 1060, the given policy may not be implemented by the system enforcement engine. Thus, one can analyze policies on a given server 1000 without having to implement the policies on the server 1000. In step 3000 the analysis handler 1080 user specifies the one or more polices to analyze. In step 3010 the handler 1080 begins a loop over all of the rules of the one or more specified policies; the next unprocessed rule is taken. Step 3020 checks whether there are any conflicts between this rule and any of the other rules of the one or more policies being analyzed.

A conflict occurs if two rules have one or more required term slot entry in common and yet have differing condition terms. So, for example, the following two rules are in conflict:
  Admission nurses can use customer address or SSN for the purpose of reviewing eligibility.
And
  Admission nurses can use customer address for the purpose of reviewing eligibility if requested by patient
Because they have a:
  Common user category: admission nurses,
  Common action: use,
  Common data category: customer address,
  Common purpose: reviewing eligibility,
But the first rule has no condition, while the second has one of requested by patient. This could cause conflict because, for example, if the first rule is evaluated first, a given request for customer address by a nurse might be granted even though not requested by patient. Any such conflicts are stored in the policy analysis server 1000 using the policy analysis server database handler 1100. One method of overcoming such conflicts is by modifying one or the other rule. For example, with the two rules above, the conflict can be eliminated by deleting customer address as one of the two data categories from the first rule. Doing so would eliminate the common data category.

Next, in step 3030, the analysis handler 1080 checks whether there are any redundancies between the given current rule and any of the other rules from the one or more specified policies. This is similar to the check made in step 3020 except that at step 3030, a check is made to determine whether there are any other rules in any of the one or more selected policies in which all of the term categories have a common subset of terms. For example the rules:
  Physicians can use medical records for the purpose of making treatment decisions.
And
  Physicians or nurses can use SSN or medical records for the purpose of confirming identity or making treatment decisions.
Are redundant because each rule has the following common (single-element) subsets of term categories:
  Common user category: {Physicians},
  Common action: {use},
  Common data category: {medical records},
  Common purpose: {making treatment decisions}.
The handler 1080 stores an indication of any such redundancies using the policy analysis server database handler 1100. A customer might well want to eliminate such rules since the first rule does not add any additional access rights. Further, redundancies make policy management more difficult. If, in the future, the first rule were to be deleted, the resulting rule set would still have precisely the same access rights. One of ordinary skill in the art will appreciate that the situation posed by the two rules above could be overcome by eliminating the first rule (it being a logical subset of the second).

Finally, in step 3050, the analysis handler 1080, provides a summary of any and all of the conflicts and redundancies found. One of ordinary skill in the art will appreciate that the handler 1080 could also provide alerts when any redundancies or conflicts are identified.

One of ordinary skill in the art will also appreciate that a service organization may run the analysis shown above for a customer organization. The service includes both the identification of any conflicts and redundancies, as well as suggestions as to how to overcome any such problems, (e.g., through rule modification or deletion). The service organization could provide these modifications as well (e.g., using the authoring handler 1050).

Figure 4:
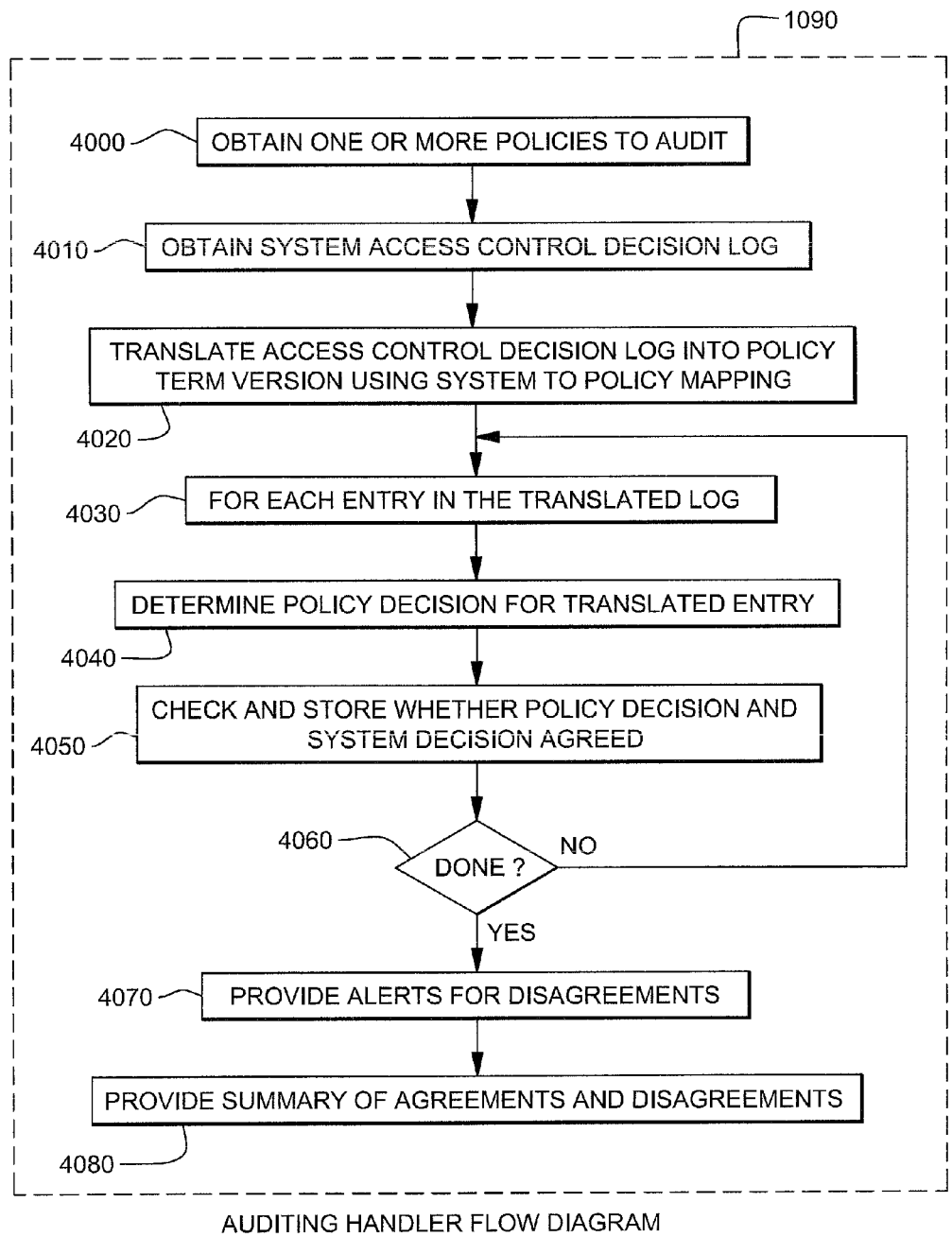
FIG. 4 is a flow diagram of the auditing handler of FIG. 1 in one embodiment of the present invention.

FIG. 4 depicts the control flow of the auditing handler 1090, which allows a user to compare the access decision log from the system enforcement engine handler 1070 to one or more policies. Note that the entries from a given access control log can be compared to the rules of a given policy even if the policy was not explicitly implemented in the system enforcement engine handler 1070. In step 4000, one or more policies are selected to be checked, and in step 4010, a log of the access control decisions is obtained. Note that the log need not have been produced by the current system's 1000 system enforcement engine handler 1070, (e.g., the log could be from another system), and the log could have been made in the past.

The only requirement is that there is a mapping (i.e., an association stored using the policy analysis server database handler 1100) between all of the system objects (e.g., users and resources) mentioned in the log and the policy terms contained in the one or more selected policies. E.g., if user jdoe 1234 is mentioned in the log, and jdoe 1234 is a doctor, and doctor is one of the policy terms in one of the rules in one of the selected policies, then it is assumed that user jdoe 1234 was mapped to user category doctor, e.g., using the mapping handler 1060. Using this mapping, each entry in the log is translated into policy terms in step 4020. Note that a given entry in the translated log might contain a set for one of its elements if more than one term is mapped to a given system object. So, for example if jdoe 1234 is also mapped to teacher, then the log entry:
Jdoe1245 READ SYS.DAT.QWERTY app4321 ACCEPT
  where: this entry indicates that user jdoe1234 was allowed to read resource sys.dat.qwerty using application app4321
  Would get mapped to:
{Doctor, teacher} use patient data approval ACCEPT.
  Where this translated log entry indicates the user categories doctors and teachers were allowed to use data category patient data for the purpose of approval.
Step 4030 begins a loop that checks each entry in the translated log. Then, in step 4040, the auditing handler 1090 determines the policy decision for the translated entry; and in step 4050, the handler 1090 checks whether the given translated log entry agrees with all of the selected policies. This check requires the handler 1090 to determine if any of the rules of the selected policies would have permitted the given request. For this to be true, each of the translated log entry's elements must match at least one of the corresponding rule terms. So for example, the translated log entry above would match either of the following rules:

Doctors can use patient data for the purpose of approval
And
Teachers can use patient data for the purpose of approval If a matching rule is found and the logged decision was an approval, then agreement for the log entry is stored using the policy analysis server database handler 1100; if denial was logged, then disagreement for the given log entry is stored using the policy analysis server database handler 1100. Step 4060 checks whether all translated log entries have been checked, control continuing at step 4030 if not. Otherwise control continues at step 4070 where alerts for all of the disagreements are generated, following which a summary of all agreements are disagreements is produced in step 4080.

Several examples of the invention are presented below.

Figure 5:
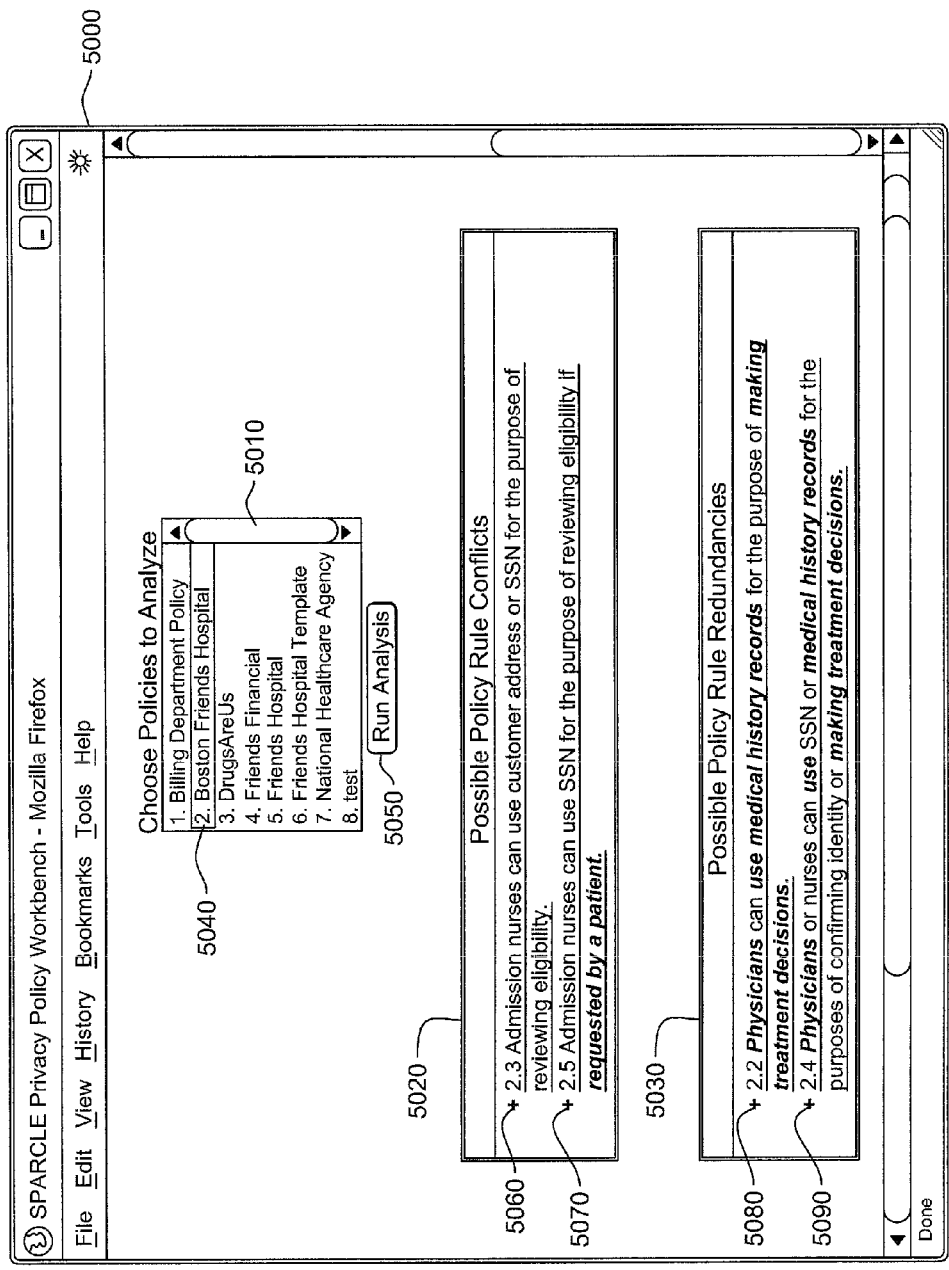
FIG. 5 is a GUI for the analysis handler in one embodiment of the present invention, shown processing a single policy.
Figure 6:
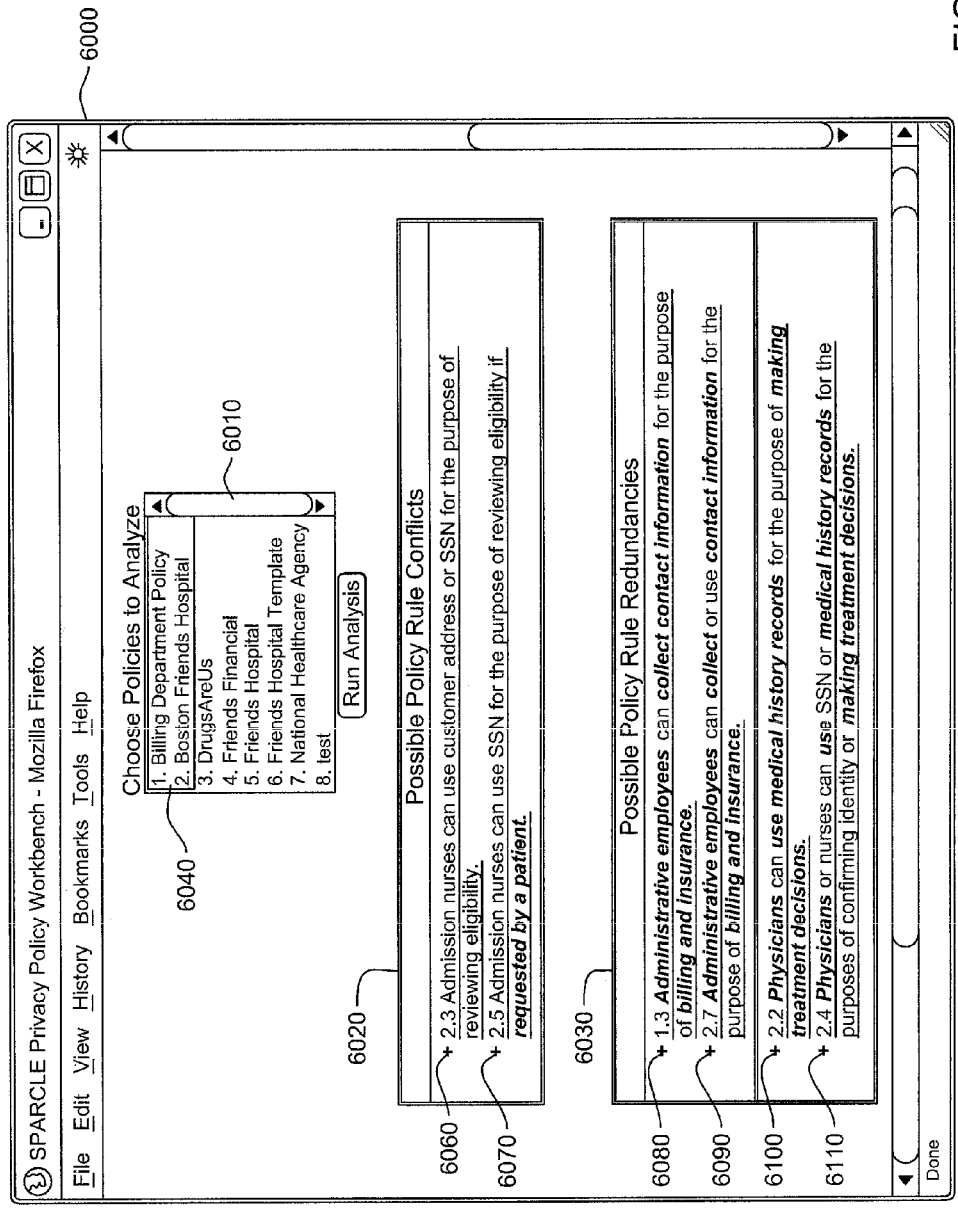
FIG. 6 is a GUI for the analysis handler in one embodiment of the present invention, shown processing two policies.

FIGS. 5 and 6 depict examples 5000 and 6000 of a graphical user interface GUI that allows users to interact with the analysis handler 1080. FIG. 5 shows a GUI for processing a single policy, and FIG. 6 shows a GUI for processing two policies.

Scenario No. 1

The following is a usage scenario that demonstrates how a user can employ the current invention to check whether their current policies comply with a new legislative policy template. Note that even though in the following example the actions are all performed by a service organization, these same actions could also be performed by the customer organization.

1. The ACME Company employs the IGBS service company to check whether ACME's corporate access control policies comply with the new TRIAD legislation.

2. IGBS creates a legislative policy template that expresses the access control restrictions and permissions specified in the TRIAD legislation. IGBS does this using the authoring handler 1050 running on ACME's policy analysis server 1000.

3. IGBS then uses the analysis handler 1080 on ACME's policy analysis server 1000, selecting the new legislative policy template along with all of ACME's corporate access control policies.

4. Several conflicts with the legislative policy template are identified.

5. IGBS, as requested by ACME, modifies the relevant existing policies to eliminate these conflicts using the authoring handler 1050.

6. The analysis also identifies several redundancies in ACME's corporate access control policies.

7. IGBS eliminates these redundancies as well using the authoring handler 1050.

One of ordinary skill in the art will appreciate that IGBS could have written the legislative policy template for TRIAD on its own policy analysis server 1000. IGBS then could use this same policy template for many different clients. One part of the service engagement might include mapping a client's system objects to the policy terms used in the legislative template.

Scenario No. 2

The following is a usage scenario that demonstrates how a user can employ the current invention to check that a new proposed policy complies with one or more pieces of legislation, each of which is encoded in a corresponding legislative policy template.

1. The ACME Company employs the IGBS service company to check whether ACME's new corporate privacy policy complies with four major pieces of legislation.

2. IGBS adds the legislative policy templates for the four major pieces of legislation into ACME's policy analysis server 1000 using its authoring handler 1050.

3. IGBS then uses the analysis handler 1080 on ACME's policy analysis server 1000, selecting the new corporate privacy policy along with the four legislative policy templates.

4. Several conflicts with the legislative policy templates are identified.

5. IGBS, as requested by ACME, modifies the privacy policy to eliminate these conflicts using the authoring handler 1050.

6. The analysis also identified several redundancies in ACME's new corporate privacy policy.

7. IGBS eliminates these as well using the authoring handler 1050.

Scenario No. 3

The following is a usage scenario that demonstrates how a user can employ the current invention to check that the access control decisions of their existing enforcement engine comply with one or more pieces of legislation, each of which is encoded in a corresponding legislative policy template.

1. The ACME Company employs the IGBS service company to check that the corporate server's access control decisions comply with four new pieces of legislation.

2. IGBS brings to the ACME Company a laptop computer, which runs all of the policy analysis server 1000 software. This laptop already has stored in it legislative policy templates for the four new pieces of legislation.

3. IGBS obtains a log of the decisions made by ACME corporate server for the last year.

4. IGBS then builds a mapping between the system objects mentioned in the log and the policy terms used in the four legislative policy templates. IGBS builds this mapping using the mapping handler 1060 running on its laptop.

5. IGBS then runs the auditing handler 1090 and identifies all agreements and disagreements between the logged decisions and the four legislative policy templates.

6. IGBS then provides a summary of these agreements and disagreements to ACME, this summary indicating not only which system entries disagree, but also how/why each disagrees with the four legislative policy templates.

Note that in Scenario No. 3, IGBS, the service organization used a policy analysis server 1000 running on its own laptop computer. For some customers this would be considered a benefit because their computers would not have to be modified by having new software installed or run. In other circumstances, a given customer might prefer to have the policy analysis server's software, i.e., the handler's 1050, 1060, 1080-1100, running on their own organization's computers. One of ordinary skill in the art will appreciate that a service organization like IGBS could provide the installation, maintenance, and operating education services for this software. The service organization could also provide new legislative policy templates, as well as updates to existing one (these updates possibly covering updates to the corresponding legislation).

One of ordinary skill in the art will appreciate that even though a service organization was employed in each of the scenarios discussed above, the client organization could have performed the processing themselves.

As will be readily apparent to those skilled in the art, the present invention, or aspects of the invention, can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

Figure 7:
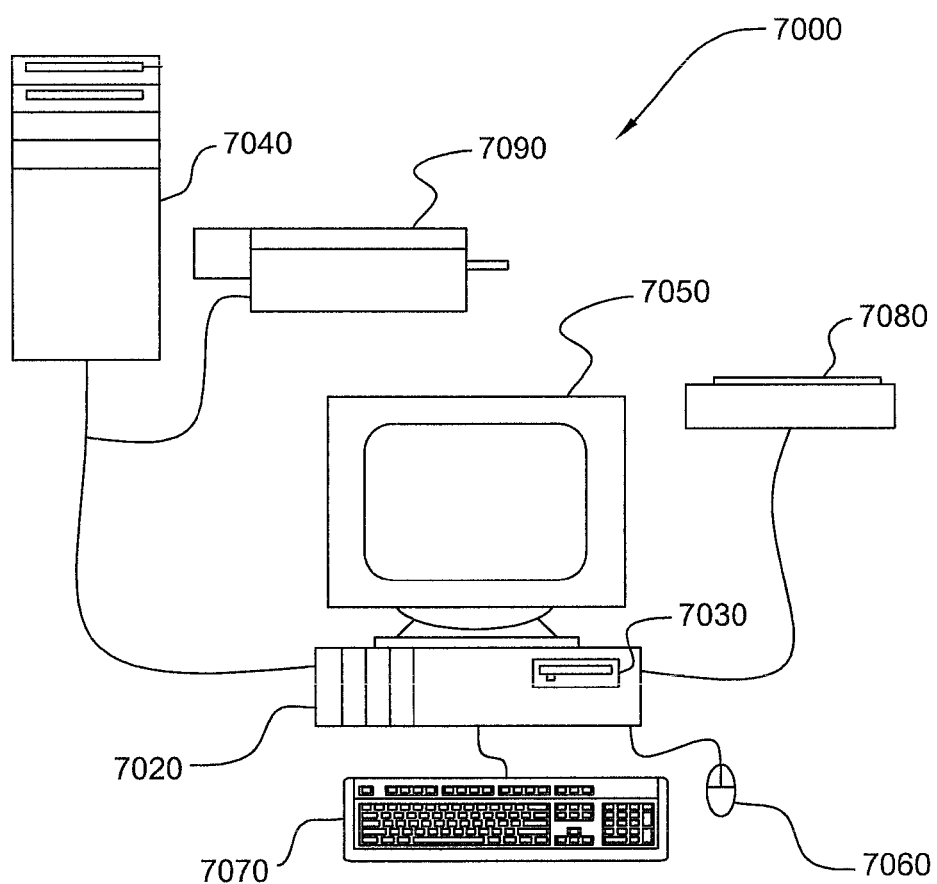
FIG. 7 illustrates a computer system that may be used in the practice of this invention.

For example, FIG. 7 illustrates a computer system 7000 on which the present invention may be carried out. Processing unit 7020, houses a processor, memory and other systems components that implement a general purpose processing system that may execute a computer program product comprising media, for example a floppy disc that may be read by processing unit 7020 through floppy drive 7030.

The program product may also be stored on hard disk drives within processing unit 7020 or may be located on a remote system 7040 such as a server, coupled to processing unit 7020, via a network interface, such as an Ethernet interface. Monitor 7050, mouse 7060 and keyboard 7070 are coupled to processing unit 7020, to provide user interaction. Scanner 7080 and printer 7090 are provided for document input and output. Printer 7090, is shown coupled to processing unit 7020 via a network connection, but may be coupled directly to the processing unit. Scanner 7080 is shown coupled to processing unit 7020 directly, but it should be understood that peripherals may be network coupled or direct coupled without affecting the ability of workstation computer 7000 to implement the invention.

The present invention, or aspects of the invention, can also be embodied in a computer program product, which comprises all the respective features enabling the implementation of methods or procedures described herein, and which—when loaded in a computer system—is able to carry out those methods or procedures. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of analyzing policies for compliance with a specified policy standard for controlling specified actions, comprising the steps of: creating, by using a hardware processing unit, a policy template representing said specified policy standard by expressing the specified policy standard as a set of standard rules; and
    comparing, by using the hardware processing unit, a group of given privacy policies to said policy template to determine whether said given privacy policies are in compliance with said specified policy standard by expressing each of the given privacy policies as a set of policy rules, and comparing the policy rules with the standard rules to determine whether the policy rules are in compliance with the standard rules for allowing the specified actions; and when one or more of said given privacy policies is not in compliance with the specified policy standard, modifying said one or more of said given privacy policies to eliminate conflicts between the group of privacy policies and the specified policy standard and to ensure compliance of the given privacy policies with the specified policy standard for allowing the specified actions; and wherein: the specified policy standard is enacted legislation, and the comparing step includes the step of comparing said privacy policies to said policy template to determine whether said privacy policies are in compliance with said legislation;
    said legislation includes a set of rules, and the step of creating a policy template includes the step of creating a policy template expressing said set of rules of said legislation, whereby if there are no conflicts between the privacy policies and said policy template, then the privacy policies are in compliance with said legislation;
    each of the policy rules includes a first set of defined categories and one or more data items in each of said defined categories;
    the policy standard includes a second set of defined categories and one or more data items in each of said defined categories; and
    the comparing includes for each of the policy rules, comparing selected ones of the data items in defined categories of the policy rule with selected ones of the data items in the defined categories of the policy standard to determine if the selected ones of the data items in the defined categories of the policy rules are the same as the selected ones of the data items in the defined categories of the policy standard.

2. A method according to claim 1, comprising the further steps of:
    identifying any redundancies in said given policies; and
    if any redundancies are found in said given policies, modifying one or more of said given policies to eliminate said any redundancies.

3. A method according to claim 1, wherein:
    the step of creating a policy template includes the steps of providing the policy template with a set of identified categories and with one or more data items in each of said categories, said set of identified categories and data items of the policy template identifying a set of permissions and restrictions, and wherein each of the categories of the rules is associated with one of the categories of the policy template; and
    the comparing step includes the step of, for each of a group of selected categories of each of the given rules, comparing the one or more data items in said selected category with the one or more data items in the associated category of the policy template to determine whether said given policies conflict with said specified policy.

4. A method according to claim 3, wherein the defined categories of the rules include:
    a user category to identify roles or users for the rule;
    a permission field to indicate whether the result of the rule is the permitting or the denial of a specified access;
    an action category to specify the function or application that is either permitted or denied by the rule; and
    a data field to indicate the type of data object that is governed by the rule.

5. A system for analyzing policies for compliance with a specified policy standard for controlling specified actions, the system comprising: one or more processing units configured to function as: an authoring handler for creating a policy template representing said specified policy by expressing the specified policy standard as a set of standard rules; and an analysis handler for comparing a group of given privacy policies to said policy template to determine whether said given privacy policies are in compliance with said specified policy standard by expressing each of the given privacy policies as a set of policy rules, and comparing the policy rules with the standard rules to determine whether the policy rules are in compliance with the standard rules for allowing the specified actions; and when one or more of said given privacy policies is not in compliance with the specified policy standard, modifying said one or more of said given privacy policies to eliminate conflicts between the group of privacy policies and the specified policy standard and to ensure compliance of the given privacy policies with the specified policy standard for allowing the specified actions; and wherein: the specified policy standard is enacted legislation, and the comparing step includes the step of comparing said privacy policies to said policy template to determine whether said privacy policies are in compliance with said legislation;

said legislation includes a set of rules, and the step of creating a policy template includes the step of creating a policy template expressing said set of rules of said legislation, whereby if there are no conflicts between the privacy policies and said policy template, then the privacy policies are in compliance with said legislation;

each of the policy rules includes a first set of defined categories and one or more data items in each of said defined categories;

the policy standard includes a second set of defined categories and one or more data items in each of said defined categories; and the comparing includes for each of the policy rules, comparing selected ones of the data items in defined categories of the policy rule with selected ones of the data items in the defined categories of the policy standard to determine if the selected ones of the data items in the defined categories of the policy rules are the same as the selected ones of the data items in the defined categories of the policy standard.

6. A system according to claim 5, wherein the analysis handler is adapted to identify any redundancies in said given policies; and if any redundancies are found in said given policies, to modify one or more of said given policies to eliminate said any redundancies.

7. An article of manufacture comprising:

at least one computer usable device having computer readable program code logic for analyzing policies for compliance with a specified policy standard for controlling specified actions, the computer readable program code logic comprising: creating logic for creating a policy template representing said specified policy by expressing the specified policy standard as a set of standard rules; comparing logic for comparing a group of given privacy policies to said policy template to determine whether said given privacy policies are in compliance with said specified policy standard by expressing each of the given privacy policies as a set of policy rules, and comparing the policy rules with the standard rules to determine whether the policy rules are in compliance with the standard rules for allowing the specified actions; and modifying logic for modifying one or more of said given privacy policies, when one or more of said given privacy policies is not in compliance with the specified policy standard, to eliminate all the conflicts between the given privacy policies and the specified policy standard and to ensure compliance of the given privacy policies with the specified policy standard for allowing the specified actions; and wherein: the specified policy standard is enacted legislation, and the comparing step includes the step of comparing said privacy policies to said policy template to determine whether said privacy policies are in compliance with said legislation;

said legislation includes a set of rules, and the step of creating a policy template includes the step of creating a policy template expressing said set of rules of said legislation, whereby if there are no conflicts between the privacy policies and said policy template, then the privacy policies are in compliance with said legislation;

each of the policy rules includes a first set of defined categories and one or more data items in each of said defined categories;

the policy standard includes a second set of defined categories and one or more data items in each of said defined categories; and the comparing includes for each of the policy rules, comparing selected ones of the data items in defined categories of the policy rule with selected ones of the data items in the defined categories of the policy standard to determine if the selected ones of the data items in the defined categories of the policy rules are the same as the selected ones of the data items in the defined categories of the policy standard.

8. A method of analyzing access privacy policies of a given organization to determine whether said policies comply with a given standard having access control restrictions and requirements, the method comprising the steps of: a service provider creating, by using a hardware processing unit, a policy template expressing said access control restrictions and requirements of the given standard by expressing the specified policy standard as a set of standard rules; said service provider comparing, by using the hardware processing unit, said access privacy policies of the given organization to said policy template to determine whether said access privacy policies are in compliance with said given standard by expressing each of the access privacy policies as a set of policy rules, and comparing the policy rules with the standard rules to determine whether the policy rules are in compliance with the standard rules for allowing the specified actions; and when one or more of said access privacy policies is not in compliance with the specified policy standard, modifying said one or more of said access policies to eliminate conflicts between the access privacy policies and the specified policy standard and to ensure compliance of the access privacy policies with the specified policy standard for allowing the specified actions; and wherein: the specified policy standard is enacted legislation, and the comparing step includes the step of comparing said privacy policies to said policy template to determine whether said privacy policies are in compliance with said legislation; said legislation includes a set of rules, and the step of creating a policy template includes the step of creating a policy template expressing said set of rules of said legislation, whereby if there are no conflicts between the privacy policies and said policy template, then the privacy policies are in compliance with said legislation;

each of the policy rules includes a first set of defined categories and one or more data items in each of said defined categories;

the policy standard includes a second set of defined categories and one or more data items in each of said defined categories; and the comparing includes for each of the policy rules, comparing selected ones of the data items in defined categories of the policy rule with selected ones of the data items in the defined categories of the policy standard to determine if the selected ones of the data items in the defined categories of the policy rules are the same as the selected ones of the data items in the defined categories of the policy standard.

9. A method according to claim 8, wherein the comparing step includes the steps of:
the service provider obtaining a log of access decisions made by the given organization over a given time period;
comparing said access decisions with said policy template to identify agreements and disagreements between said access decisions and the policy template;
each of said access decisions identifies an associated system object;
the policy template includes a set of terms;
the obtaining step includes the step of the service provider building a mapping between said associated system objects and said set of terms; and
the step of comparing said access decisions includes the step of using said mapping to identify the agreements and the disagreements between the access decisions and the policy template.

10. A method according to claim 8, wherein said given organization has a server computer, the access policies are on said server computer, and the comparing step includes the step of:
said service provider using the server computer of the given organization to perform the comparing step.

11. A method according to claim 8, wherein said given organization has a server computer, the access policies are on said server computer, the service provider ahs a service provider computer, and the comparing step includes the step of:
the service provider obtaining the access policies from the server computer of the given organization, and using the service provider computer to compare said access policies to said policy template.

12. A method according to claim 8, comprising the further step of said service provider identifying redundancies in said access policies, and modifying said access policies to eliminate said redundancies.

13. A system for analyzing access privacy policies of a given organization to determine whether said privacy policies comply with a given standard having access control restrictions and requirements, the system comprising: a service provider computer for creating a policy template expressing said access control restrictions and requirements of the given standard by expressing the specified policy standard as a set of standard rules; for comparing said access privacy policies of the given organization to said policy template determine whether said access privacy policies are in compliance with said given standard by expressing each of the access privacy policies as a set of policy rules, and comparing the policy rules with the standard rules to determine whether the policy rules are in compliance with the standard rules for allowing the specified actions; and when one or more of said access privacy policies is not in compliance with the specified policy standard, modifying said one or more of said access privacy policies to eliminate conflicts between the access privacy policies and the specified policy standard and to ensure compliance of the access privacy policies with the specified policy standard for allowing the specified actions; and wherein: the specified policy standard is enacted legislation, and the comparing step includes the step of comparing said privacy policies to said policy template to determine whether said privacy policies are in compliance with said legislation;

said legislation includes a set of rules, and the step of creating a policy template includes the step of creating a policy template expressing said set of rules of said legislation, whereby if there are no conflicts between the privacy policies and said policy template, then the privacy policies are in compliance with said legislation;
each of the policy rules includes a first set of defined categories and one or more data items in each of said defined categories;
the policy standard includes a second set of defined categories and one or more data items in each of said defined categories; and
the comparing includes for each of the policy rules, comparing selected ones of the data items in defined categories of the policy rule with selected ones of the data items in the defined categories of the policy standard to determine if the selected ones of the data items in the defined categories of the policy rules are the same as the selected ones of the data items in the defined categories of the policy standard.

14. A system according to claim 13, wherein:
the service provider computer obtains a log of access decisions made by the given organization over a given time period, and compares said access decisions with said policy template to identify agreements and disagreements between said access decisions and the policy template;
each of said access decisions identifies an associated system object;
the policy template includes a set of terms; and
the service provider computer builds a mapping between said associated system objects and said set of terms, and uses said mapping to identify the agreements and the disagreements between the access decisions and the policy template.

15. A system according to claim 12, wherein:
said given organization has a server computer, the access policies are on said server computer; and
said service provider computer uses the server computer of the given organization to compare said access policies of the given organization to said policy template.

16. The method according to claim 1, wherein:
each of the standard rules and each of the policy rules include data entries and condition terms; and
one of the policy rules conflicts with one of the standard rules if said one of the policy rules and said one of the standard rules have specified ones of the data entries in common and have different condition terms.

17. The method according to claim 1, wherein the specified policy standard includes a plurality of policy terms, and the comparing a group of given policies to said policy template includes:
maintaining a log of decisions made using the group of given policies, said log having entries identifying a multitude of system objects;
building a mapping between all of the system objects identified in the log and the policy terms in the specified policy standard;
using said mapping, translating each entry in the log into one or more of the policy terms to perform a translated log having entries;
checking each entry in the translated log to determine a policy discussion for said each entry; and
checking whether said each entry in the translated log agrees with the specified policy, including determining whether said each entry in the translated log matches one of the standard rules.

18. The method according to claim 1, wherein:
one of the data items of each policy rule is a condition term for allowing one of the specified actions;
one of the data items of the policy standard is a condition term for allowing said one of the specified actions; and
the comparing includes comparing the condition terms of said each policy rule with the condition term of the policy standard to determine if said condition terms are the same.

* * * * *